Jan. 24, 1950

G. R. ELLIOTT 2,495,369

POWER CHAMBER

Filed Feb. 23, 1944

INVENTOR.
GORDON R. ELLIOTT,
BY
*Robert A. Sloman*
ATTORNEY.

Patented Jan. 24, 1950

2,495,369

UNITED STATES PATENT OFFICE 2,495,369

POWER CHAMBER

Gordon R. Elliott, Ferndale, Mich., assignor to Irving A. Puchner and Edward U. Demmer, Milwaukee, Wis.

Application February 23, 1944, Serial No. 523,780

3 Claims. (Cl. 137—157)

This invention relates to pneumatic power chambers, and more particularly to air and vacuum suspended power chambers having a movable member therein adapted for transmitting forceful longitudinal motion to a vehicle brake operating shaft extending therefrom.

It is the object of the present invention to provide a power chamber containing a diaphragm adapted to forceful movement upon the establishing of a pressure differential on opposite sides thereof.

It is the further object herein to provide within said power chamber a diaphragm actuated piston means for transferring the forceful motion of said diaphragm to a longitudinally reciprocable power brake shaft connected thereto.

It is the further object of this invention to obtain a multiplication of the force exerted upon said piston by pivotally mounting the same within the power chamber and pivotally joining the operating shaft thereto at a point intermediate the piston support and its center point.

Other objects will be seen from the following specification and claims which disclose the various arrangements of the elements of this invention and their combinations as illustrated in the accompanying drawing of which—

Figure 1:
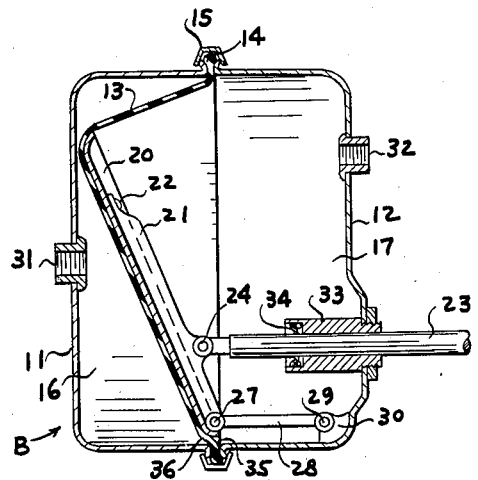
Figure 1 is a sectional elevational view of a vacuum suspended power chamber.
Figure 2:
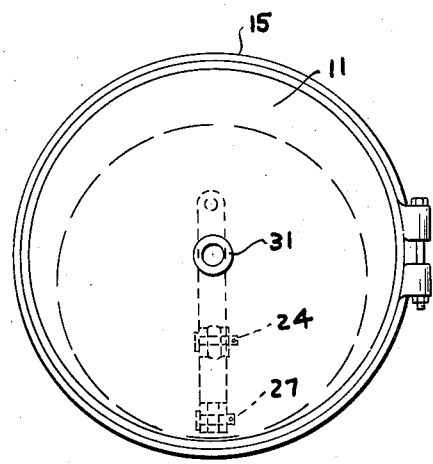
Figure 2 is a left end elevational view thereof.
Figure 3:
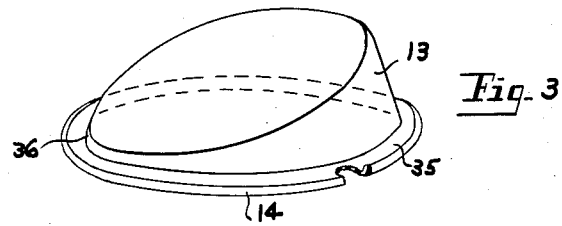
Figure 3 is a perspective view of the diaphragm shown in Figure 1.

In the drawing, Fig. 1 shows the vacuum suspended power chamber consisting of the hollow oppositely disposed annular shell members 11 and 12 with flexible conically shaped sealing diaphragm 13 positioned and secured therebetween. Said diaphragm, cup shaped, or triangularly recessed, is preferably constructed of rubber or other suitable substitute as, for instance, Neoprene, which is an artificial rubber having similar characteristics of flexibility and durability.

Said diaphragm consists of the annular flat face portion 35 with peripheral bead or lip 14. Said diaphragm is conically shaped, and has a lower pivoting edge 36 adjacent flat face portion 35. It will be noted that said pivoting edge 36 is adjacent to and corresponds with the pivotal connection 27 between lever 28 and piston plate 21.

The peripheral lip 14 of diaphragm 13 extends outside shell members 11 and 12 and is secured within the hollow annular clamping ring 15. Diaphragm 13 centrally and peripherally secured within power chamber B defines therein the variable chambers 16 and 17 on opposite sides thereof.

Cup shaped reinforcement power transmitting plate 20, suitably secured to diaphragm 13, acts as a stiffener therefore, and is adapted for transmitting the forceful movement thereof to piston plate 21 secured thereto as at 22.

Power transmitting shaft 23 pivotally joined to piston plate 21 at 24 within power chamber B projects outwardly therefrom. It should be noted that the pivotal connection 24 is positioned intermediate pivot 27 and the central point of diaphragm 13.

Piston plate 21 is pivotally joined at its lower end at 27 to the end of floating lever 28, the other end of which is pivotally supported at 29 to an interior portion 30 of shell member 12. Lever 28, being pivotal around point 29, provides a floating support for piston plate 21 permitting thereby vertical displacement of its pivotal point of support 27 during pivotal movement of said piston plate under action of diaphragm 13.

Thus it is seen upon establishing a pressure differential between chambers 16 and 17 that this differential is effective throughout the entire opposite surface of diaphragm 13 in obtaining forceful movements thereof.

With the total effective force being directed at a central point of diaphragm 13, a multiplication of the effectiveness of that force is obtained by the pivotal connection 27 for said diaphragm, in view of the lever arm effective between said central portion and pivot point 27. This force is transmitted to power brake actuating shaft 23, but through a shorter lever arm equal to the distance between pivotal points 24 and 27. Because of the differences of lengths of lever arms, it is understood that an increase of the effective force in shaft 23 is obtained.

The lower portion of diaphragm 13 is limited in its movement to the pivotal movement of piston plate 21 around its pivotal support 27. While on the other hand it is seen that the excess diaphragm portion above plate 21 permits a very substantial movement thereof between chambers 16 and 17. It is this movement of the diaphragm which is transmitted to brake operating shaft 23 through reinforcement plate 20 and piston plate 21.

By means of floating support 27—28 it is possible to maintain the pivotal connection of shaft 23 in substantially horizontal positions.

Figure 4:
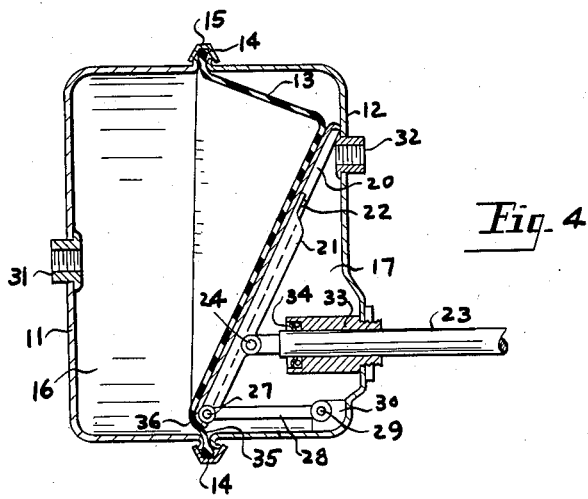
Figure 4 is an elevational section of the power chamber of Figure 1 with its diaphragm in operated position.

In Figure 4 conically shaped diaphragm 13 is flexed to the position shown. Pivotal support 28 is susceptible to some vertical movement up or down during brake application, however, as shown in Figure 4 said lever still has approximately the same horizontal position, when diaphragm 13 has been flexed to operative position.

Fig. 1 illustrates a vacuum suspended construction wherein shell members 11 and 12 forming power chamber B have inlet connections 31 and 32 respectively for constantly maintaining vacuum in both chambers 16 and 17.

An equilibrium or balance is thus obtained therebetween so that for brake release diaphragm 13 assumes the position shown in Fig. 1. For brake application, and by means of a suitable hand valve, not shown herein, air may be supplied as desired to chamber 16 through connection 31 provisioned within shell member 11.

The pressure differential established, effective over the entire surface of diaphragm 13 causes an immediate forceful pivotal translation of diaphragm 13 to the right into chamber 17 in turn causing similar pivotal movement of reinforcing member 20 and piston plate 21, with the result that power brake operating shaft 23 is projected to the right with a force exceeding the initial force due to lever arm 24—27.

Inasmuch as in brake release position it is necessary that vacuum be maintained in chambers 16 and 17, a suitable hollow channel member 33 is provided secured to shell member 12 and projecting into chamber 17. Annular sealing member 34 provisioned within the recessed inner end of channel member 33 thereby provides a suitable air-tight seal with respect to power shaft 23 which slidably projects through said channel member as shown in Fig. 1.

By virtue of the floating pivotal connection 27 of piston plate 21 it is seen upon pivotal movement of said plate that the same is adapted to vertical displacements so that the pivotal connection 24 between power shaft 23 and piston plate 21 is maintained in a horizontal plane.

By this arrangement chamber 17 is effectively sealed from the atmosphere and at the same time a non-binding movement of shaft 23 is effected relative to seal 34 and its supporting channel member 33.

To again obtain an equilibrium between chambers 16 and 17 for effecting brake release, it is merely necessary by means of said hand valve to again establish vacuum communication to chamber 16 through its connection 31.

Having described my invention reference should now be had to the claims which follow for determining the scope thereof.

I claim:

1. A power chamber comprising a hollow housing, a flexible substantially conically shaped diaphragm with a pivoting edge positioned through said housing and peripherally secured thereto so as define with said said housing pressure chambers on the opposite sides thereof, a pivoted support, a plate carried by said diaphragm and pivotally joined to the free end of said support adjacent said pivoting edge, a longitudinally reciprocable shaft extending through said housing and pivotally joined to said plate at a point between the center of said plate and the connection of said plate with the pivotal support, and means limiting the reciprocation of said shaft to straight line movement, said pivoted support allowing vertical movement of said plate thereby preventing binding of said shaft due to the provision of said movement limiting means.

2. A power chamber comprising a hollow housing, a flexible substantially conically shaped diaphragm with a pivoting edge positioned through said housing and peripherally secured thereto so as define with said housing pressure chambers on the opposite sides thereof, a support pivotally mounted at one end within said housing, a plate carried by said diaphragm and pivotally joined to the free end of said support adjacent said pivoting edge, a longitudinally reciprocable shaft extending through said housing and pivotally joined to said plate at a point between the center of said plate and the connection of said plate with the pivotal support and means limiting the reciprocation of said shaft to straight line movement, said pivoted support allowing vertical movement of said plate thereby preventing binding of said shaft due to the provision of said movement limiting means.

3. A power chamber comprising a hollow housing, a flexible substantially conically shaped diaphragm with a pivoting edge positioned through said housing and peripherally secured thereto so as define with said housing pressure chambers on the opposite sides thereof, a pivoted support, a plate carried by said diaphragm and pivotally joined to the free end of said support adjacent said pivoting edge, a longitudinally reciprocable shaft extending through said housing and pivotally joined to said plate at a point between the center of said plate and the connection of said plate with the pivotal support, means limiting the reciprocation of said shaft to straight line movement, said pivoted support allowing vertical movement of said plate thereby preventing binding of said shaft due to the provision of said movement limiting means, and vacuum connections on each chamber, one of said connections being adapted for intermittent communication with an air source.

GORDON R. ELLIOTT.

REFERENCES CITED

The following references are of record in the file of this patent:

UNITED STATES PATENTS

| Number | Name | Date |
|--------|------|------|
| 881,402 | Hoglund | Mar. 10, 1908 |
| 1,684,850 | Skinner | Sept. 18, 1928 |
| 1,814,535 | Wigle | July 14, 1931 |
| 2,045,861 | Kuskin | June 30, 1936 |
| 2,134,072 | Christensen | Oct. 25, 1938 |
| 2,208,282 | Shelor | July 16, 1940 |

FOREIGN PATENTS

| Number | Country | Date |
|--------|---------|------|
| 11,763 | England | 1847 |
| 448,394 | France | June 17, 1912 |